US008131012B2

(12) United States Patent
Eaton et al.

(10) Patent No.: US 8,131,012 B2
(45) Date of Patent: Mar. 6, 2012

(54) BEHAVIORAL RECOGNITION SYSTEM

(75) Inventors: John Eric Eaton, Houston, TX (US);
Wesley Kenneth Cobb, Woodlands, TX (US); Dennis Gene Urech, Katy, TX (US); Bobby Ernest Blythe, Houston, TX (US); David Samuel Friedlander, Houston, TX (US); Rajkiran Kumar Gottumukkal, Houston, TX (US); Lon William Risinger, Katy, TX (US); Kishor Adinath Saitwal, Houston, TX (US); Ming-Jung Seow, Houston, TX (US); David Marvin Solum, Houston, TX (US); Gang Xu, Houston, TX (US); Tao Yang, Houston, TX (US)

(73) Assignee: BEHAVIORAL RECOGNITION SYSTEMS, Inc., Houston, TX (US)

( * ) Notice: Subject to any disclaimer, the term of this patent is extended or adjusted under 35 U.S.C. 154(b) by 1030 days.

(21) Appl. No.: 12/028,484

(22) Filed: Feb. 8, 2008

(65) Prior Publication Data
US 2008/0193010 A1 Aug. 14, 2008

Related U.S. Application Data

(60) Provisional application No. 60/888,777, filed on Feb. 8, 2007.

(51) Int. Cl.
*G06K 9/00* (2006.01)
(52) U.S. Cl. ............ 382/103; 382/155; 340/573.1
(58) Field of Classification Search ............ 382/100, 382/103, 107, 155, 173, 224; 348/143; 340/573.1
See application file for complete search history.

(56) References Cited

U.S. PATENT DOCUMENTS

| 4,679,077 | A | 7/1987 | Yuasa et al. | 358/108 |
| 4,998,162 | A | 3/1991 | Kondo et al. | 358/41 |
| 5,091,780 | A | 2/1992 | Pomerleau | 358/108 |
| 5,677,733 | A | 10/1997 | Yoshimura et al. | 348/362 |
| 6,532,022 | B1 | 3/2003 | Ahmad | 345/629 |
| 6,642,940 | B1 | 11/2003 | Dakss et al. | 345/723 |

(Continued)

FOREIGN PATENT DOCUMENTS
WO 2005/096215 A1 10/2005

OTHER PUBLICATIONS

PCT International Search Report & Written Opinion for PCT/US08/53457, dated Jul. 22, 2008.

(Continued)

*Primary Examiner* — Andrew W Johns
(74) *Attorney, Agent, or Firm* — Patterson & Sheridan, LLP

(57) ABSTRACT

Embodiments of the present invention provide a method and a system for analyzing and learning behavior based on an acquired stream of video frames. Objects depicted in the stream are determined based on an analysis of the video frames. Each object may have a corresponding search model used to track an object's motion frame-to-frame. Classes of the objects are determined and semantic representations of the objects are generated. The semantic representations are used to determine objects' behaviors and to learn about behaviors occurring in an environment depicted by the acquired video streams. This way, the system learns rapidly and in real-time normal and abnormal behaviors for any environment by analyzing movements or activities or absence of such in the environment and identifies and predicts abnormal and suspicious behavior based on what has been learned.

30 Claims, 11 Drawing Sheets

U.S. PATENT DOCUMENTS

| | | | |
|---|---|---|---|
| 6,661,918 B1 | 12/2003 | Gordon et al. | 382/173 |
| 6,825,769 B2 | 11/2004 | Colmenarez et al. | 340/575 |
| 6,856,249 B2 | 2/2005 | Strubbe et al. | 340/573.1 |
| 6,940,998 B2 | 9/2005 | Garoutte | 382/103 |
| 7,034,833 B2 | 4/2006 | Epshteyn | 345/473 |
| 7,076,102 B2 | 7/2006 | Lin et al. | 382/218 |
| 7,136,097 B1 | 11/2006 | Toyoda et al. | 348/222.1 |
| 7,136,525 B1 | 11/2006 | Toyama et al. | 382/173 |
| 7,236,190 B2 | 6/2007 | Yanof et al. | 348/222.1 |
| 7,254,268 B2 | 8/2007 | Zhao et al. | 382/190 |
| 7,308,136 B2 | 12/2007 | Curry et al. | 382/164 |
| 7,349,574 B1 | 3/2008 | Sodini et al. | 382/168 |
| 7,508,455 B2 | 3/2009 | Liu et al. | 348/587 |
| 7,535,511 B2 | 5/2009 | Wu et al. | 348/364 |
| 7,639,741 B1 | 12/2009 | Holt et al. | 375/240.08 |
| 7,710,466 B2 | 5/2010 | Drader et al. | 348/224.1 |
| 7,929,729 B2 | 4/2011 | Huang et al. | 382/103 |
| 2003/0107650 A1 | 6/2003 | Colmenarez et al. | 348/150 |
| 2004/0032906 A1 | 2/2004 | Lillig | 375/240.08 |
| 2004/0151374 A1 | 8/2004 | Lipton et al. | 382/181 |
| 2004/0162827 A1 | 8/2004 | Nakano | 707/6 |
| 2005/0104958 A1 | 5/2005 | Egnal et al. | 348/143 |
| 2005/0105765 A1 | 5/2005 | Han et al. | 382/100 |
| 2005/0219362 A1 | 10/2005 | Garoutte | 348/180 |
| 2005/0259848 A1 | 11/2005 | Garoutte | 382/103 |
| 2005/0286764 A1 | 12/2005 | Mittal et al. | 382/181 |
| 2006/0018516 A1 | 1/2006 | Masoud et al. | 382/115 |
| 2006/0190419 A1 | 8/2006 | Bunn et al. | 706/2 |
| 2006/0221181 A1 | 10/2006 | Garoutte | 348/143 |
| 2006/0222206 A1 | 10/2006 | Garoutte | 382/103 |
| 2006/0225120 A1 | 10/2006 | Lee et al. | 725/131 |
| 2007/0092149 A1 | 4/2007 | Sung | 382/239 |
| 2007/0263900 A1* | 11/2007 | Medasani et al. | 382/103 |
| 2008/0266413 A1 | 10/2008 | Cohen et al. | 348/222.1 |
| 2009/0087024 A1 | 4/2009 | Eaton et al. | 382/103 |
| 2009/0087085 A1 | 4/2009 | Eaton et al. | 382/159 |
| 2009/0087086 A1 | 4/2009 | Eaton et al. | 382/164 |
| 2009/0087093 A1 | 4/2009 | Eaton et al. | 382/173 |
| 2009/0087096 A1 | 4/2009 | Eaton et al. | 382/190 |
| 2010/0124378 A1 | 5/2010 | Das et al. | 382/225 |
| 2010/0150471 A1 | 6/2010 | Cobb et al. | 382/274 |
| 2010/0208986 A1 | 8/2010 | Cobb et al. | 382/165 |
| 2010/0260376 A1 | 10/2010 | Cobb et al. | 382/103 |

OTHER PUBLICATIONS

S. Apewokin et al., "Multimodal Mean Adaptive Backgrounding for Embedded Real-Time Video Surveillance," Embedded Computer Vision Workshop (ECVW07) 2007: pp. 1-6.

Ahmed Elgammal et al., "Non-parametric model for background subtraction," IEEE Frame-Rate Workshop, 2000: pp. 751-767.

Ismail Haritaoglu et al., "W4: Real-Time Surveillance of People and Their Activities," IEEE Transactions on Pattern Analysis and Machine Intelligence (TPAMI), Aug. 2000, vol. 22(8): pp. 809-830.

Yuri Ivanov et al., "Video Surveillance of Interactions," CVPR Workshop on Visual Surveillance, 1998: pp. 82-89.

Pentti Kanerva, "Sparse Distributed Memory and Related Models," *Associative Neural Memories: Theory and Implementation*, New York: Oxford University Press, 1993: pp. 1-41.

Andrew Senior et al., "Appearance Models for Occlusion Handling," $2^{nd}$ IEEE Workshop on Performance Evaluation of Tracking and Surveillance, 2001: pp. 1-8.

Chris Stauffer et al., "Adaptive background mixture models for real-time tracking," Proceedings IEEE Conference on Computer Vision and Pattern Recognition, 1999: pp. 246-252.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," $14^{th}$ Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

* cited by examiner

BEHAVIORAL RECOGNITION SYSTEM

CROSS REFERENCE TO RELATED APPLICATION

This application claims benefit of U.S. provisional patent application Ser. No. 60/888,777 filed on Feb. 8, 2007, which is hereby incorporated by reference in its entirety.

BACKGROUND OF THE INVENTION

1. Field of the Invention

The present invention generally relates to video analysis, and more particularly to analyzing and learning behavior based on streaming video data.

2. Description of the Related Art

Some currently available video surveillance systems have simple recognition capabilities. However, many such surveillance systems require advance knowledge (before a system has been developed) of the actions and/or objects the systems have to be able to seek out. Underlying application code directed to specific "abnormal" behaviors must be developed to make these surveillance systems operable and sufficiently functional. In other words, unless the underlying code includes descriptions of certain behaviors, the system will be incapable of recognizing such behaviors. Further, for distinct behaviors, separate software products often need to be developed. This makes the surveillance systems with recognition capabilities labor intensive and prohibitively costly. For example, monitoring airport entrances for lurking criminals and identifying swimmers who are not moving in a pool are two distinct situations, and therefore may require developing two distinct software products having their respective "abnormal" behaviors pre-coded.

The surveillance systems may also be designed to memorize normal scenes and generate an alarm whenever what is considered normal changes. However, these types of surveillance systems must be pre-programmed to know how much change is abnormal. Further, such systems cannot accurately characterize what has actually occurred. Rather, these systems determine that something previously considered "normal" has changed. Thus, products developed in such a manner are configured to detect only a limited range of predefined types of behaviors.

SUMMARY OF THE INVENTION

Embodiments of the present invention provide a method and a system for analyzing and learning behavior based on an acquired stream of video frames. Objects depicted in the stream are determined based on an analysis of the video frames. Each object may have a corresponding search model, which are used to track objects' motions frame-to-frame. Classes of the objects are determined and semantic representations of the objects are generated. The semantic representations are used to determine objects' behaviors and to learn about behaviors occurring in an environment depicted by the acquired video streams. This way, the system learns rapidly and in real-time normal and abnormal behaviors for any environment by analyzing movements or activities or absence of such in the environment and identifies and predicts abnormal and suspicious behavior based on what has been learned.

One particular embodiment of the invention includes a method for processing a stream of video frames recording events within a scene. The method may generally include receiving a first frame of the stream. The first frame includes data for a plurality of pixels included in the frame. The method may further include identifying one or more groups of pixels in the first frame. Each group depicts an object within the scene. The method may still further include generating a search model storing one or more features associated with each identified object, classifying each of the objects using a trained classifier, tracking, in a second frame, each of the objects identified in the first frame using the search model, and supplying the first frame, the second frame, and the object classifications to a machine learning engine. The method may still further include generating, by the machine learning engine, one or more semantic representations of behavior engaged in by the objects in the scene over a plurality of frames. The machine learning engine may generally be configured to learn patterns of behavior observed in the scene over the plurality of frames and to identify occurrences of the patterns of behavior engaged in by the classified objects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
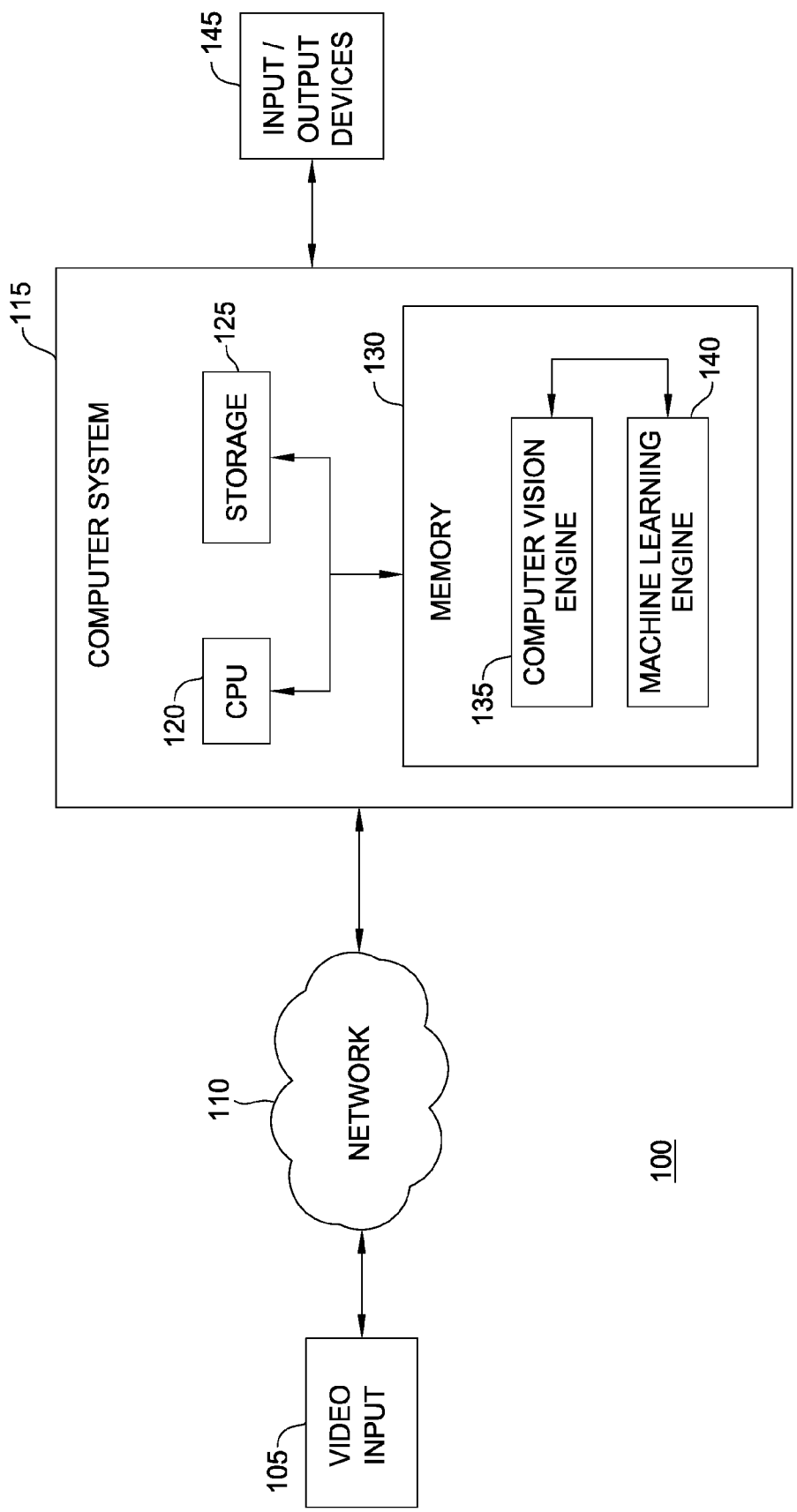
FIG. 1 is a high-level block diagram of a behavior recognition system, according to one embodiment of the present invention.

Machine-learning behavior-recognition systems, such as embodiments of the invention described herein, learn behaviors based on information acquired over time. In context of the present invention, information from a video stream (i.e., a sequence of individual video frames) is analyzed. This disclosure describes a behavior recognition system that learns to identify and distinguish between normal and abnormal behavior within a scene by analyzing movements and/or activities (or absence of such) over time. Normal/abnormal behaviors are not pre-defined or hard-coded. Instead, the behavior recognition system described herein rapidly learns what is "normal" for any environment and identifies abnormal and suspicious behavior based on what is learned through monitoring the location, i.e., by analyzing the content of recorded video frame-by-frame.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Embodiments of the present invention provide a behavior recognition system and a method for analyzing, learning, and recognizing behaviors. FIG. 1 is a high-level block diagram of the behavior recognition system 100, according to one embodiment of the present invention. As shown, the behavior recognition system 100 includes a video input 105, a network 110, a computer system 115, and input and output devices 145 (e.g., a monitor, a keyboard, a mouse, a printer, and the like).

The network 110 receives video data (e.g., video stream(s), video images, or the like) from the video input 105. The video input 105 may be a video camera, a VCR, DVR, DVD, computer, or the like. For example, the video input 105 may be a stationary video camera aimed at certain area (e.g., a subway station) and continuously recording the area and events taking place therein. Generally, the area visible to the camera is referred to as the "scene." The video input 105 may be configured to record the scene as a sequence of individual video frames at a specified frame-rate (e.g., 24 frames per second), where each frame includes a fixed number of pixels (e.g., 320×240). Each pixel of each frame specifies a color value (e.g., an RGB value). Further, the video stream may be formatted using known such formats e.g., MPEG2, MJPEG, MPEG4, H.263, H.264, and the like. As discussed in greater detail below, the behavior recognition system analyzes this raw information to identify active objects in the stream, classifies such elements, derives a variety of metadata regarding the actions and interactions of such elements, and supplies this information to a machine learning engine. In turn, the machine learning engine may be configured to evaluate, learn, and remember over time. Further, based on the "learning," the machine learning engine may identify certain behaviors as anomalous.

The network 110 may be used to transmit the video data recorded by the video input 105 to the computer system 115. In one embodiment, the network 110 transmits the received stream of video frames to the computer system 115.

Illustratively, the computer system 115 includes a CPU 120, storage 125 (e.g., a disk drive, optical disk drive, floppy disk drive, and the like), and memory 130 containing a computer vision engine 135 and machine learning engine 140. The computer vision engine 135 may provide a software application configured to analyze a sequence of video frames provided by video input 105. For example, in one embodiment, the computer vision engine 135 may be configured to analyze video frames to identify targets of interest, track those targets of interest, infer properties about the targets of interest, classify them by categories, and tag the observed data. In one embodiment, the computer vision engine 135 generates a list of attributes (such as texture, color, and the like) of the classified objects of interest and provides the list to the machine learning engine 140. Additionally, the computer vision engine may supply the machine learning engine 140 with a variety of information about each tracked object within a scene (e.g., kinematic data, depth data, color, data, appearance data, etc.).

The machine learning engine 140 receives the video frames and the results generated by the computer vision engine 135. The machine learning engine 140 analyzes the received data, builds semantic representations of events depicted in the video frames, determines patterns, and learns from these observed behaviors to identify normal and/or abnormal events. The computer vision engine 135 and the machine learning engine 140 and their components are described in greater detail below. Data describing whether a normal/abnormal behavior/event has been determined and/or what such behavior/event is may be provided to an output devices 145 to issue alerts, for example, an alert message presented on a GUI interface screen.

In general, both the computer vision engine 135 and the machine learning engine 140 process the received video data in real-time. However, time scales for processing information by the computer vision engine 135 and the machine learning engine 140 may differ. For example, in one embodiment, the computer vision engine 135 processes the received video data frame by frame, while the machine learning engine processes the received data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior recognition system 100. For example, while the video input 105 is shown connected to the computer system 115 via the network 110, the network 110 is not always present or needed (e.g., the video input 105 may be directly connected to the computer system 115). Further, in one embodiment, the computer vision engine 135 may be implemented as a part of a video input device (e.g., as a firmware component wired directly into a video camera). In such a case, the outputs of the video camera may be provided to the machine learning engine 140 for analysis.

Figure 2:
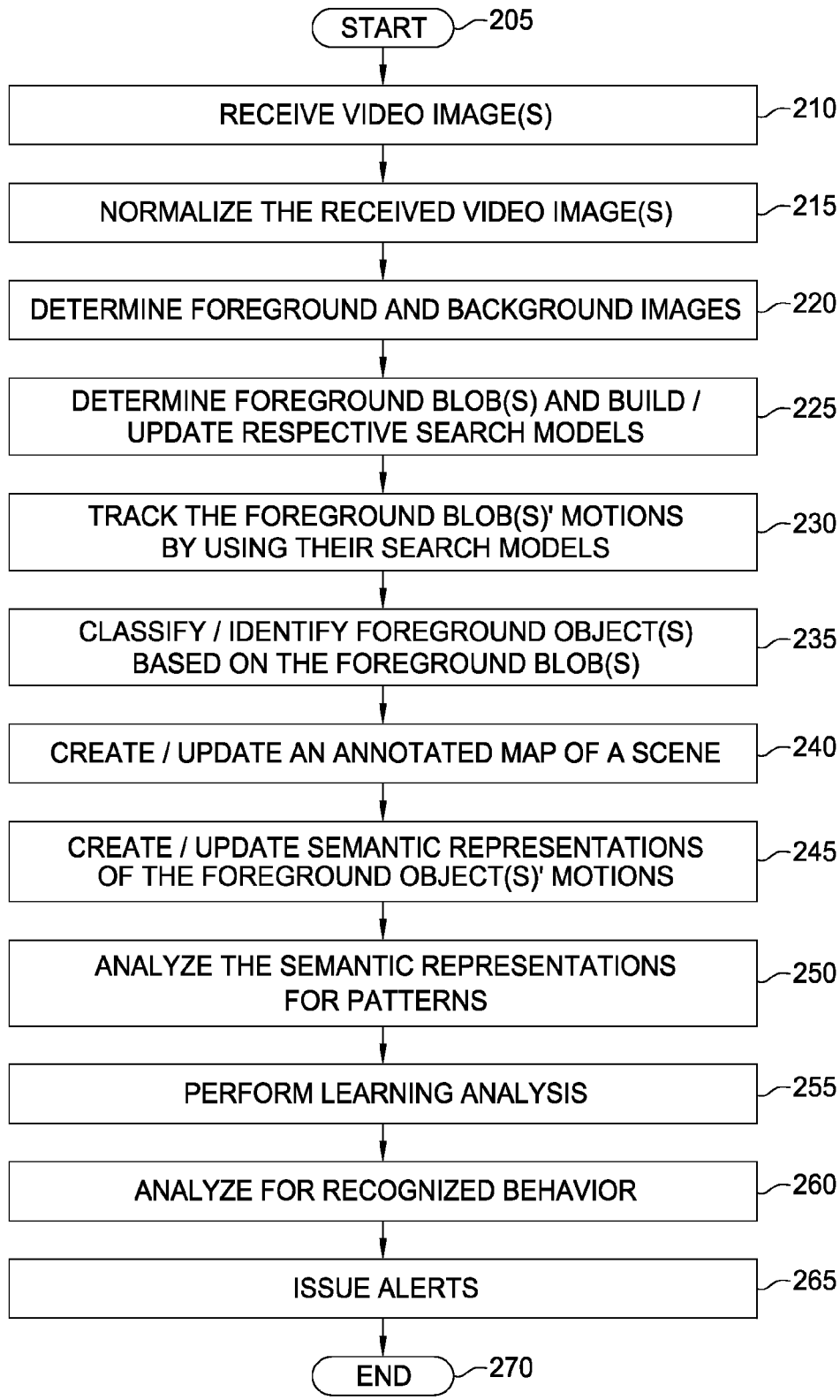
FIG. 2 illustrates a flowchart of a method for analyzing and learning behavior based on a stream of video frames, according to one embodiment of the present invention.

FIG. 2 illustrates a method 200 for analyzing and learning behavior from a stream of video frames, according to one embodiment of the present invention. As shown, the method 200 begins at step 205. At step 210, a set of video frames are received from a video input source. At step 215, the video frames may be processed to minimize video noise, irregular or unusual scene illumination, color-related problems, and so on. That is, the content of the video frames may be enhanced to improve visibility of the images prior to processing by components of a behavior recognition system (e.g., the computer vision engine 135 and machine learning engine 140 discussed above).

At step 220, each successive video frame is analyzed to identify and/or update a foreground and background image for use during subsequent stages of the method 200. In general, the background image includes stationary elements of the scene being captured by the video input (e.g., pixels depicting a platform of a subway station), while the foreground image includes volatile elements captured by the video input (e.g., pixels depicting a man moving around the platform). In other words, the background image provides a stage upon which foreground elements may enter, interact with one another, and leave. The background image may include a color value for each pixel in the background image. In one embodiment, the background image may be derived by sampling color values for a given pixel over number of frames. Also, as new frames are received, elements of the background image may be updated based on additional information included in each successive frame. Typically, which pixels are parts of the background or foreground may be determined for each frame in a sequence of video frames, and foreground elements may be identified by comparing the background image with the pixel color values in a given frame. Once the foreground pixels are identified, a mask may be applied to the frame, effectively cutting pixels that are part of the background from an image, leaving only one or more blobs of foreground pixels in the image. For example, masks could be applied to a frame such that each foreground pixel is represented as white and each background pixel is represented as black. The resulting black and white image (represented as a two-dimensional array) may be provided to subsequent elements of the behavior recognition system. In one embodiment, the computer system 115 may be provided with initial models of a background image for a given scene.

At step 225, a foreground image associated with a given frame may be analyzed to identify a set of blobs (i.e., a group of related pixels) by segmenting the foreground image into targets of interest. In other words, the system may be configured to isolate distinct blobs within the foreground image, where each blob is likely to represents a different foreground object within the frame (e.g., a car, man, suitcase, and the like). For each foreground blob, a search model may be initialized when a foreground blob is initially identified. The search model is used to capture a position of a blob within the scheme, identity which pixels are included as part of the blob, and store a variety of metadata regarding the observed behavior of the blob from frame-to-frame. Further, the search model may be used by a tracking module to predict, find, and track motions of a corresponding object from frame-to-frame. As successive frames are received, the search model is updated as the foreground blob continues to be present through successive video frames. Such updates may be performed with each additional video frame, periodically, as new information allows the refining of the search model is received, as needed, or the like.

The search model may be implemented in a variety of ways. For example, in one embodiment, the search model may be an appearance model configured to capture a number of features about a given foreground object, including which pixels are considered part of that foreground object. The appearance model of a given object may then be updated, based on the pixels representing that object from frame to frame. In another embodiment, the search model may be a minimal bounding rectangle to encompass an object. While computed more quickly, the minimally bounding rectangle includes pixels as part of the blob that are, in fact, part of the background. Nevertheless, for some types of analysis, this approach may be effective. These search models are described below in greater detail. At step 230, the search models are used to track motions of the foreground objects as they move about the scene from frame-to-frame. That is, once an object is identified in a first frame and an appearance model (and/or bounding box) is generated for that object, the search model may be used to identify and track that object in subsequent frames, based on the appearance model (and/or bounding box), until that foreground object leaves the scene. The search model may be used to identify an object within the video frames after the object, for example, changes location or position. Thus, different types of information regarding the same objects are determined (e.g., kinematic characteristics of the object, orientation, direction of movement, and so on) as such an object moves through the scene.

At step 235, the behavior recognition system attempts to classify the foreground blobs as being one of discrete number classifications. For example, in one embodiment, the behavior recognition system may be configured to classify each foreground object as being one of a "human," a "vehicle," an "other," or an "unknown." Of course, more classifications may be used and further, classifications may be tailored to suit the needs of an individual case. For example, a behavior recognition system receiving video images of a luggage conveyer belt could classify objects on the belt as different types/sizes of luggage. After classifying a foreground object, further estimations regarding such object may be made, e.g., the object's pose (e.g., orientation, posture, and the like), location (e.g., location within a scene depicted by the video images, location relative to other objects of interest, and like), and motion (e.g., trajectory, speed, direction, and the like) are estimated. This information may be used by the machine learning engine 140 to characterize certain behaviors as normal or anomalous, based on past observations of similar objects (e.g., other objects classified as humans).

At step 240, the results of previous steps (e.g., the tracking results, the background/foreground image data, the classification results, and so on) are combined and analyzed to create a map of a scene depicted by the video frames. In one embodiment, the scene is segmented into spatially separated regions, each segment being defined by a set of pixels. The regions are sorted according to z-depth (i.e., which segment is closer and which segment is further from a video capture device) and are optionally labeled (e.g., as natural, man-made, etc.). At step 245, semantic representations of the objects' motions are created. In other words symbolic representations of the movements and/or actions of the tracked objects are created (e.g., "car parks," "car stops," "person bends," "person disappears," and so on). At step 250, the semantic representations are analyzed for recognizable patterns.

The resulting semantic representations, annotated map of a scene, and the classification results are analyzed at step 255. The behavior recognition system analyzes such results to learn patterns of behavior, generalizes based on observations, and learns by making analogies. This also allows the behavior recognition system to determine and/or learn which kind of behavior is normal and which kind of behavior is abnormal. That is, the machine learning engine may be configured to identify recognizable patterns, evaluate new behaviors for a given object, reinforce or modify the patterns of behaviors learned about a given object, etc.

At step 260, the results of the previous steps are optionally analyzed for recognized behavior. Additionally, the behavior recognition system may be configured to perform a specified action in response to recognizing the occurrence of a given event. For example, based on the results of previous steps, the behavior recognition system may issue an alert when a foreground object classified as a human engages in unusual behavior. Further, whether some behavior is "unusual" may be based on what the learning engine has "learned" to be "normal" behavior for humans in a given scene. In one embodiment, alerts are issued only if an abnormal behavior has been determined (e.g., an alert indicating that a person left unattended bag on a subway station). In another embodiment, alerts are issued to indicate that normal events are taking place in the scene (e.g., an alert indicating that a car parked). The method concludes with step 275.

It should be noted that it is not necessary to perform all of the above-described steps in the order named. Furthermore, not all of the described steps are necessary for the described method to operate. Which steps should be used, in what order the steps should be performed, and whether some steps should be repeated more often than other steps is determined, based on, for example, needs of a particular user, specific qualities of an observed environment, and so on.

Figure 3:
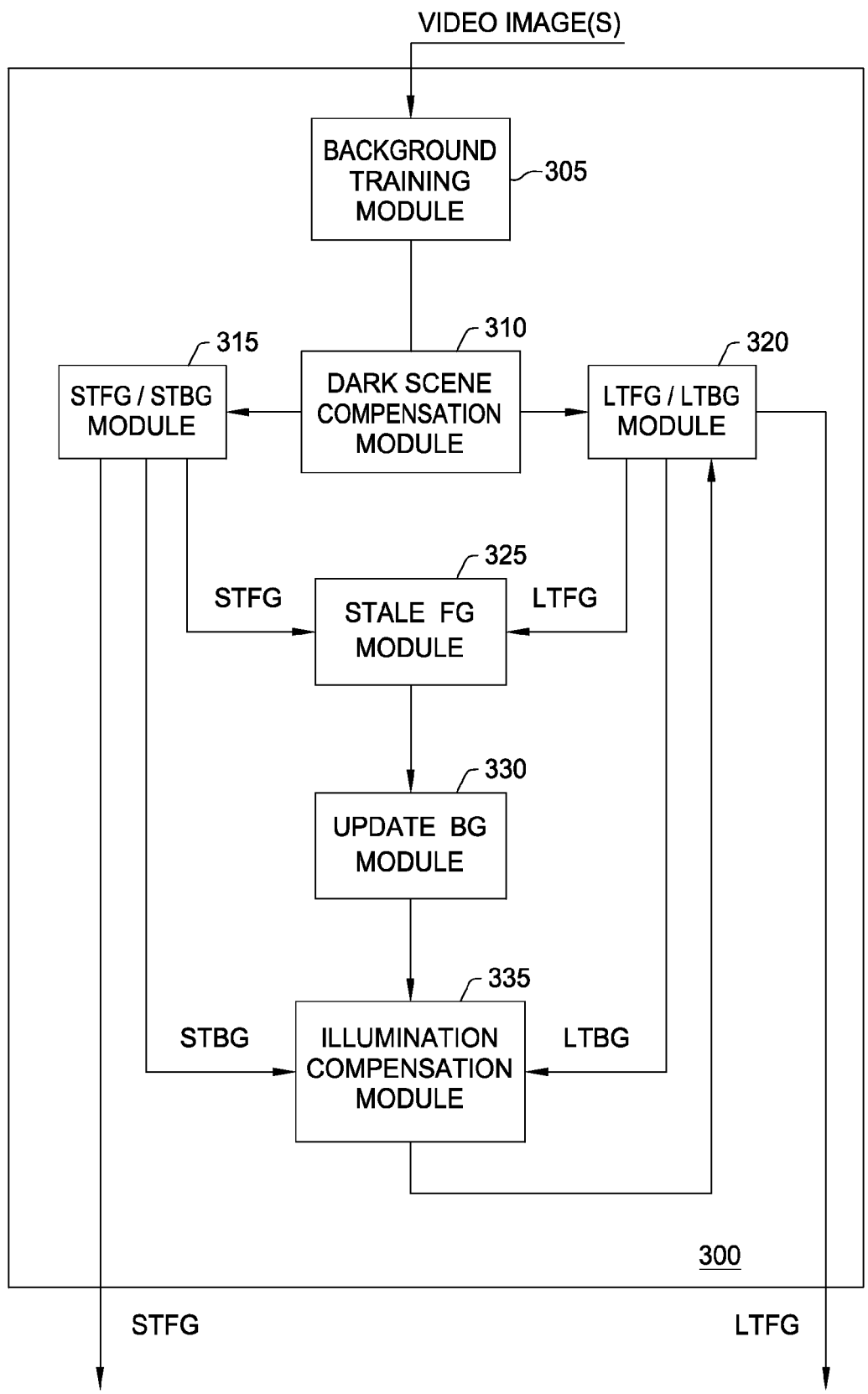
FIG. 3 illustrates a background-foreground module of a computer vision engine, according to one embodiment of the present invention.

FIGS. 3 through 6 illustrate different components of the computer vision engine 135 illustrated in FIG. 1, according to one embodiment of the present invention. Specifically, FIG. 3 illustrates components of a background-foreground module 300. The background-foreground module 300 uses features in each video frame to identify which pixels belong to a background image and which belong to a foreground image. In one embodiment, video frames are analyzed to classify each pixel as displaying part of the background image for the scene (and that frame) or displaying part of a foreground image for that frame.

Typically, pixels that do not change color over time are considered part of the background image. By sampling the color value of a pixel over time, the presence of a foreground object in some frames may be washed out. Further, as the background image may be updated dynamically, the background image may compensate for changes in light and shadow. Similarly, pixels that change color, relative to the background image, are assumed to be displaying a foreground object. In other words, the motions of foreground objects in a scene are determined based on differences between pixel color values in successive the video frames. Generally, a background image may be envisioned as a video frame of pixels having the foreground objects cut-out. Foreground images may be envisioned as pixels that occlude the background. Alternatively, only one foreground image may be used. Such foreground image may be envisioned as a transparent video frame with patches of the foreground pixels. It should be noted, that while two consecutive frames may be sufficient to track a given foreground object, comparing multiple consecutive frames provides more accurate results when determining the background image for a given scene.

It should also be noted, that a pixel originally determined as a background pixel (in one frame) may become a foreground pixel (in another frame) and vice versa. For example, if the color value of a pixel in the background begins to change, it may be appropriate to re-classify it as a foreground pixel (e.g., a car parked in a parking lot for a long period of time starts moving). Similarly, a changing pixel might become static, thus it might be necessary to re-qualify such pixel as a background pixel (e.g., a trash can has been brought to a subway station for permanent use). However, to avoid unnecessary pixels re-classification and to improve interpretation of what is included in the background and foreground images, in one embodiment, the behavior recognition system may classify pixels as being part of a short term background (STBG), short term foreground (STFG), long term background (LTBG), and long term foreground (LTFG). STBG and STFG are stored in memory for a short period of time (e.g., seconds or less), while LTBG and LTFG are stored in memory for longer period of times (e.g., minutes). Determining pixels to be STBG/STFG at first, and then interpreting only the qualifying pixels as LTBG/LTFG allows for more accurate determination of which pixels are part of the background/foreground image. Of course, the time periods may be adjusted according to the events occurring within a particular scene.

FIG. 3 illustrates components of the background-foreground module 300 that may be used to generate background and foreground images for a video frame, according to one embodiment of the invention. Initially, video frames are received by a background training module 305. The background-foreground module 300 may be trained using an initial sequence of frames. The training allows the background-foreground module 300 to build a background image of the scene depicted in the acquired video frames. The training process may occur during an initialization stage of the system; namely, before a background image of the scene has been determined.

The dark scene compensation module 310 may process pixel values to compensate for low or dark lighting conditions in portions of the scene. Additionally, the dark scene compensation module 310 may be configured to provide the processed video frames to a STFG/STBG module 315 and LTBG/LTBG module 320. The STFG/STBG module 315 may be configured to identify STFG and STBG pixels within a given frame and provide this information to a stale FG module 325 and an illumination compensation module 335, respectively. The LTFG/LTBG module 320 may be configured to identify LTFG and LTBG pixels and, similar to the STFG/STBG module 315, provide this information to the stale FG module 325 and illumination compensation module 335, respectively. The stale FG module 325 identifies stale foreground pixels and provides the results to an update BG module 330. A pixel may become "stale" when the BG/FG determination is obsolescent and needs to be reassessed. Once received, the illumination compensation module 335 may dynamically adjust the processing for changes in lighting (e.g. the brightening/darkening of a scene due to clouds obscuring the sun, or adjustments to artificial light sources), and the dark scene compensation module 310 will dynamically provide special processing in the limit of extremely dark regions and/or low-light conditions. The update BG module 330 updates a background image model and transfers the results to the illumination compensation module 335, which in turn, after processing all the received results, provides the processed results to the LTFG/LTBG module.

Thus, collectively, the background-foreground module 300 determines a set of background and foreground images and/or background and foregrounds models for use by other components of the behavior recognition system. The background and foregrounds models distinguish between pixels that are part of scene background (i.e., part of the stage) and pixels that display foreground objects (i.e., elements performing some action on the stage). It should be noted that while in the above description of the background-foreground module 300 the references are made to only one background image, alternatively, the background-foreground module 300 may employ multiple background images (e.g., the scene of the image frame might be divided in several background zones for more accurate background identification).

In one embodiment, the background model/image may include additional information, such as pixel colors. Further, the foreground model/image typically includes additional pixel characteristics, such as color. However, keeping or collecting such information might be omitted (e.g., to save resources in an environment where knowing colors does not significantly improve distinguishing between objects of interest, for example a conveyer line transporting objects of the mostly the same or similar color).

Figure 4:
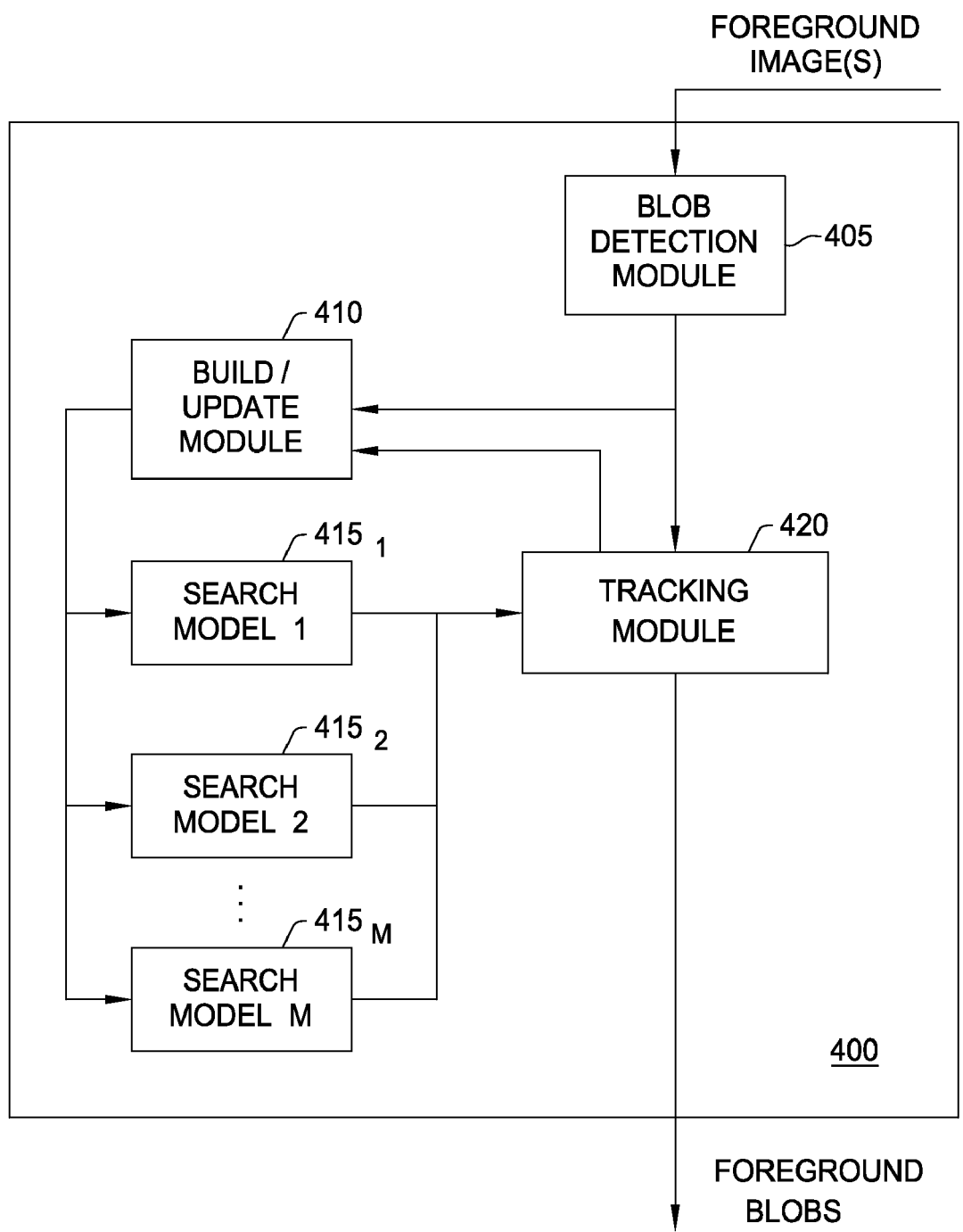
FIG. 4 illustrates a module for tracking objects of interest in a computer vision engine, according to one embodiment of the present invention.

FIG. 4 illustrates a foreground object module 400 configured to identify objects displayed in the foreground images of a scene, according to one embodiment of the invention. In general, the foreground object module 400 may be configured to receive the foreground images produced by the background-foreground module 300 for a given frame, build/update search models for the foreground images, and attempt to track motions of a displayed object in the foreground images as that object moves about the scene from frame-to-frame.

As illustrated in FIG. 4, the foreground object module 400 includes a blob detection module 405, a build/update module 410, a tracking module 420 and 1-M search models, search model 1 ($415_1$), search model 2 ($415_2$), through search model M ($415_M$). In one embodiment, the blob detection module 405 may be configured to analyze foreground images to detect groups of related pixels, referred to as the foreground blobs, where each such group of pixels is likely to represent a distinct object within the scene. Additionally, each detected foreground blob is assigned a tracking identification number. The foreground blobs are used by the build/update module 410 to build/update the search models $415_1$-$415_M$, wherein already existing search models have been built or updated for blobs identified in previous video frames. In one embodiment, to update the search models $415_1$-$415_M$, the build/update module 410 also uses results generated by the tracking module 420. If a currently detected blob has no respective search model, such search model is built (created).

At any given moment, the foreground object module 400 may include multiple search models, each representing a different foreground blob. The number of search models may depend on how many foreground blobs are identified by the blob detection module 405 within a foreground image. In one embodiment, the search models may be configured with predictive capabilities regarding what the foreground blobs may do in subsequent video frames. For example, the search model associated with a given foreground blob may include an expected future position (and shape) of that blob based on a present position and kinematic data. Further, each search model may also include a variety of information derived about a given foreground blob (e.g., textures, colors, patterns, z-depth position within a scene, size, rates of movement, kinematics and the like).

Further, different types of search models may be used according to the principles of the present invention. As stated, a search model may be used by the tracking module 420 to predict, find, and track motions of a corresponding object from frame-to-frame. In one embodiment, an appearance model is used. The appearance model includes pixels used to display an object (e.g., where a frame displays a human in the foreground image, the appearance model would include mostly pixels outlining the human and pixels inside the outline). In another embodiment the search model is implemented as a feature-based model, where the feature-based model represents pixels within a rectangle, such as a minimal bounding rectangle encompassing an object (e.g., where an object is a human, the feature based model could include a bounding rectangle encompassing the human). Alternatively, the feature-based model may include multiple bounding rectangles for a given object, such as rectangles of minimally possible sizes, encompassing different regions of that object (e.g., where the frame displays a human, the feature based model for such object could include several rectangles of minimum size where the rectangles encompass different regions of the human, such as arms, legs, head, and torso).

Which search model is used may depend, for example, on an environment being observed, preferences of a user of behavior recognition system, and so on. For example, while the appearance model is likely to provide more precise tracking, the feature based model may save resources, where, for example, shapes of the tracked objects of interest are simple (e.g., a luggage conveyer belt).

As mentioned above, the tracking module 420 uses the search models 415 to track motions of the corresponding objects depicted in a video sequence from frame-to-frame as such objects move about the scene. The tracking module 420 takes a detected foreground blob of a current video frame and seeks a search model of a previous video frame that provides the closest match with the foreground blob. In one embodiment, for each currently detected foreground blob, the tracking module 420 seeks a search model 415 such that a relative dimensional vectoring distance between the search model and the foreground blob is a global minimum. This way, the tracking module 420 may track the locations of each object represented by one of the search models 415 from frame-to-frame. In one embodiment, the tracking module 420 uses kinematic information acquired based on previous video frames to estimate locations of the search model within the current video frame.

Figure 5:
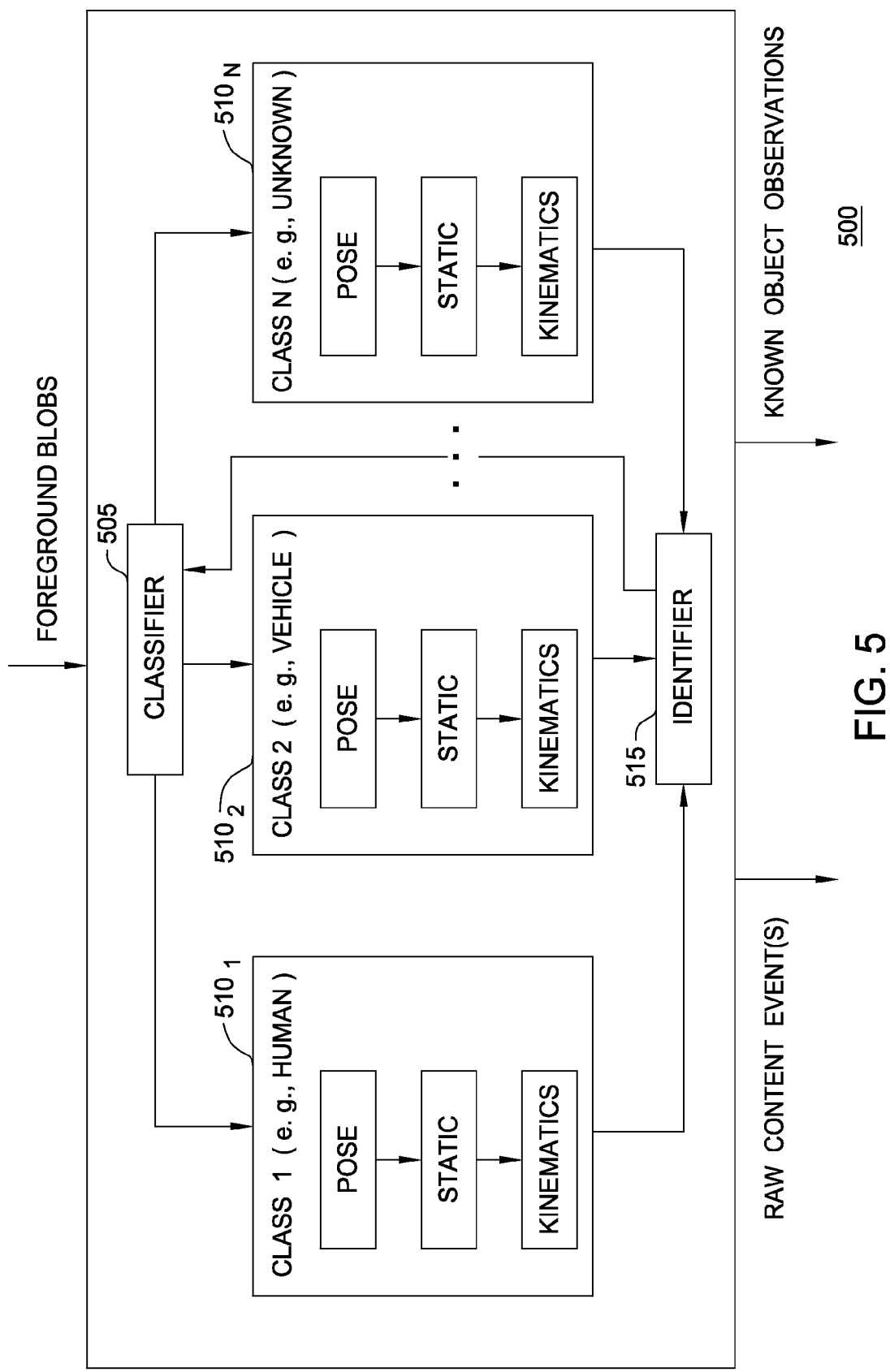
FIG. 5 illustrates an estimator/identifier module of a computer vision engine, according to one embodiment of the present invention.

FIG. 5 illustrates an estimator/identifier module 500 of a computer vision engine, according to one embodiment of the present invention. Generally, the estimator/identifier 500 receives foreground blobs and respective search models and attempts to classify objects in a video frame, as represented by the foreground blobs, as members of known categories (classes). In one embodiment, if an object of interest has been identified then the estimator/identifier module 500 estimates the object of interest's pose, location, and motion. The estimator/identifier 500 is usually trained on numerous positive and negative examples representing examples of a given class. Further, on-line training may be used to update the classifier dynamically while analyzing frame-by-frame video.

As shown, the estimator/identifier 500 includes a classifier 505, class 1 ($510_1$) through class N ($510_N$), and identifier 515. The classifier 505 attempts to classify a foreground object as a member of one of the classes, class 1 ($510_1$) through class N ($520_N$). If successful, static data (e.g., size, color, and the like) and kinematic data (e.g., speed, velocity, direction and the like) representative of the classified object may also be determined over a period of time (e.g., X-number of frames) by the identifier 515. For each identified object, the estimator/identifier 500 outputs raw context events containing the above-described static and kinematic characteristics of the object of interest and known object observations containing static and kinematic characteristic of an average member of the class of the identified object.

In one embodiment, the system employs four classifiers: human, vehicle, other, and unknown. Until a class of an object of interest is determined, such object is treated as a member of the class "unknown." Each class contains pose, static, and kinematics data regarding an average member of the class. In one embodiment, such data are continuously updated as more objects of interest are classified and identified and their pose, static, kinematics data is determined and collected. It should be noted that, typically, the estimator/identifier 500 processes information in real-time, on a frame-by-frame basis.

Figure 6:
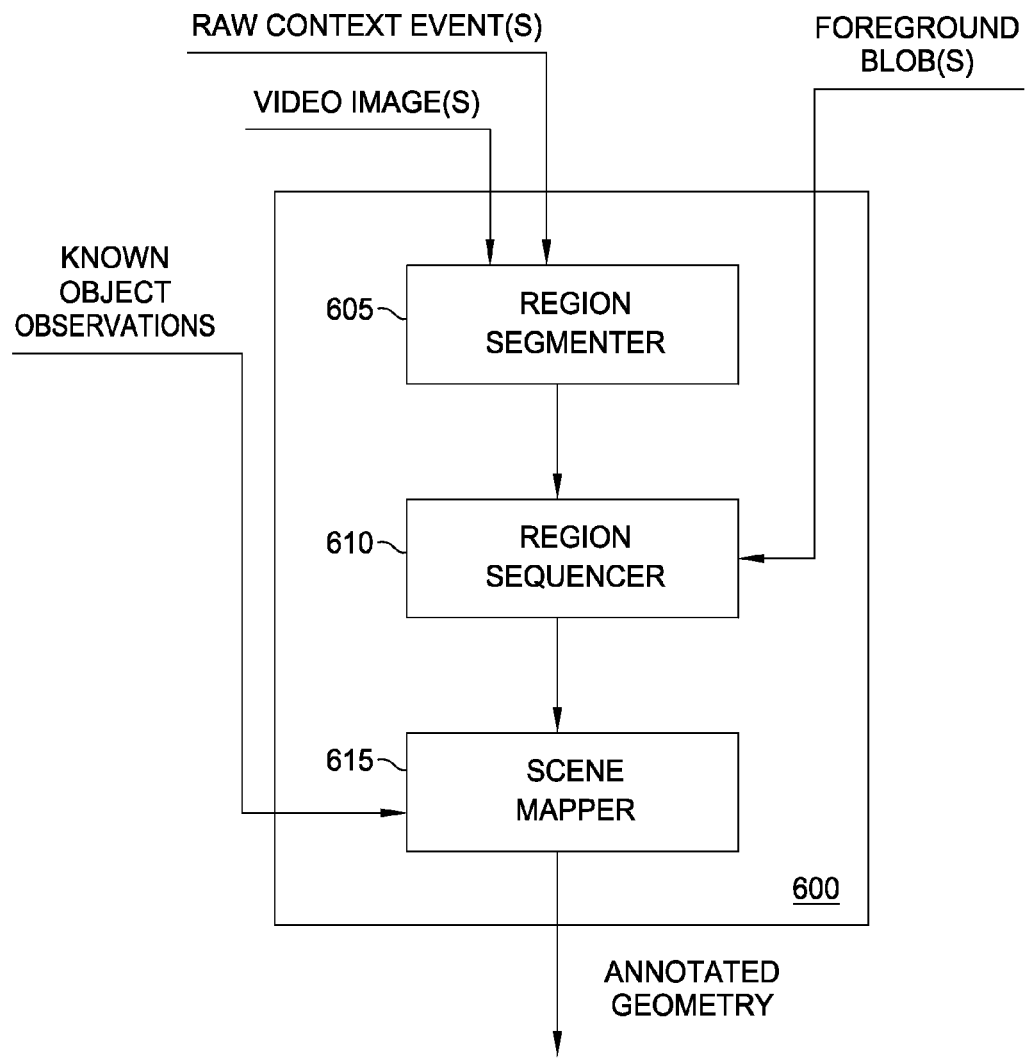
FIG. 6 illustrates a context processor component of a computer vision engine, according to one embodiment of the present invention.

FIG. 6 illustrates a context processor 600 of a computer vision engine 135, according to one embodiment of the present invention. Generally, the context processor 600 combines results received from other components of the computer vision engine 135, such as the background-foreground module 300, foreground object module 400, and the estimator/identifier module 500, to create an annotated map of a scene captured in the video frames. In one embodiment, the scene is segmented into spatially separated regions which are sorted according to z-depth of the scene and optionally labeled as depicting naturally- or man-made elements.

As shown, the context processor 600 may include a region segmenter 605 for breaking the scene into smaller areas (regions), a region sequencer 610 for defining relations between the regions (e.g., as being closer/further from a video capturing device relative to one another), and a scene mapper 615 for generating the annotated map. In one embodiment, the context processor 600 uses information regarding motions (such as trajectories) and locations of the tracked objects of interest to generate the annotated map.

Figure 7:
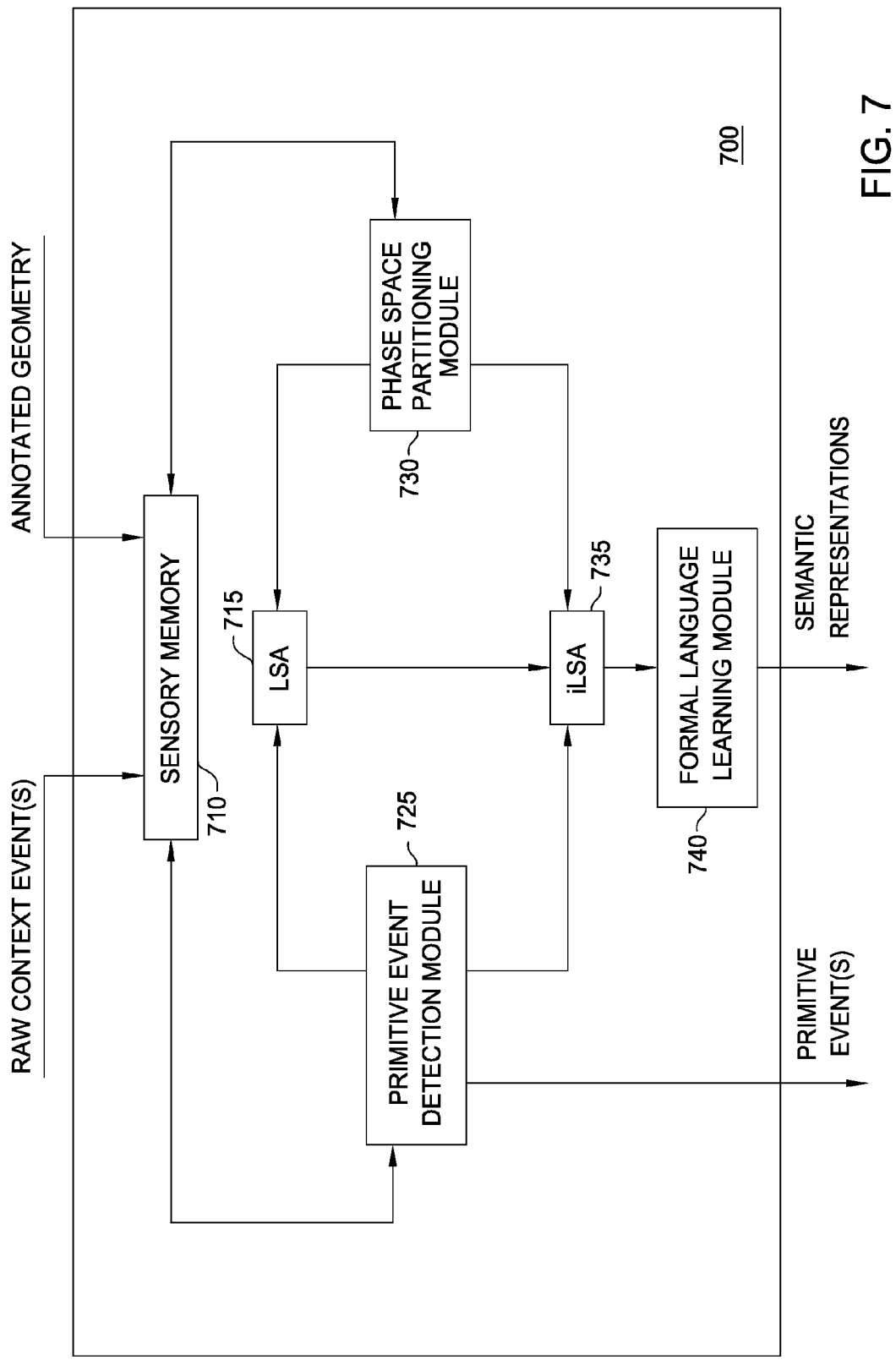
FIG. 7 illustrates a semantic analysis module of a machine learning engine, according to one embodiment of the present invention.
Figure 8:
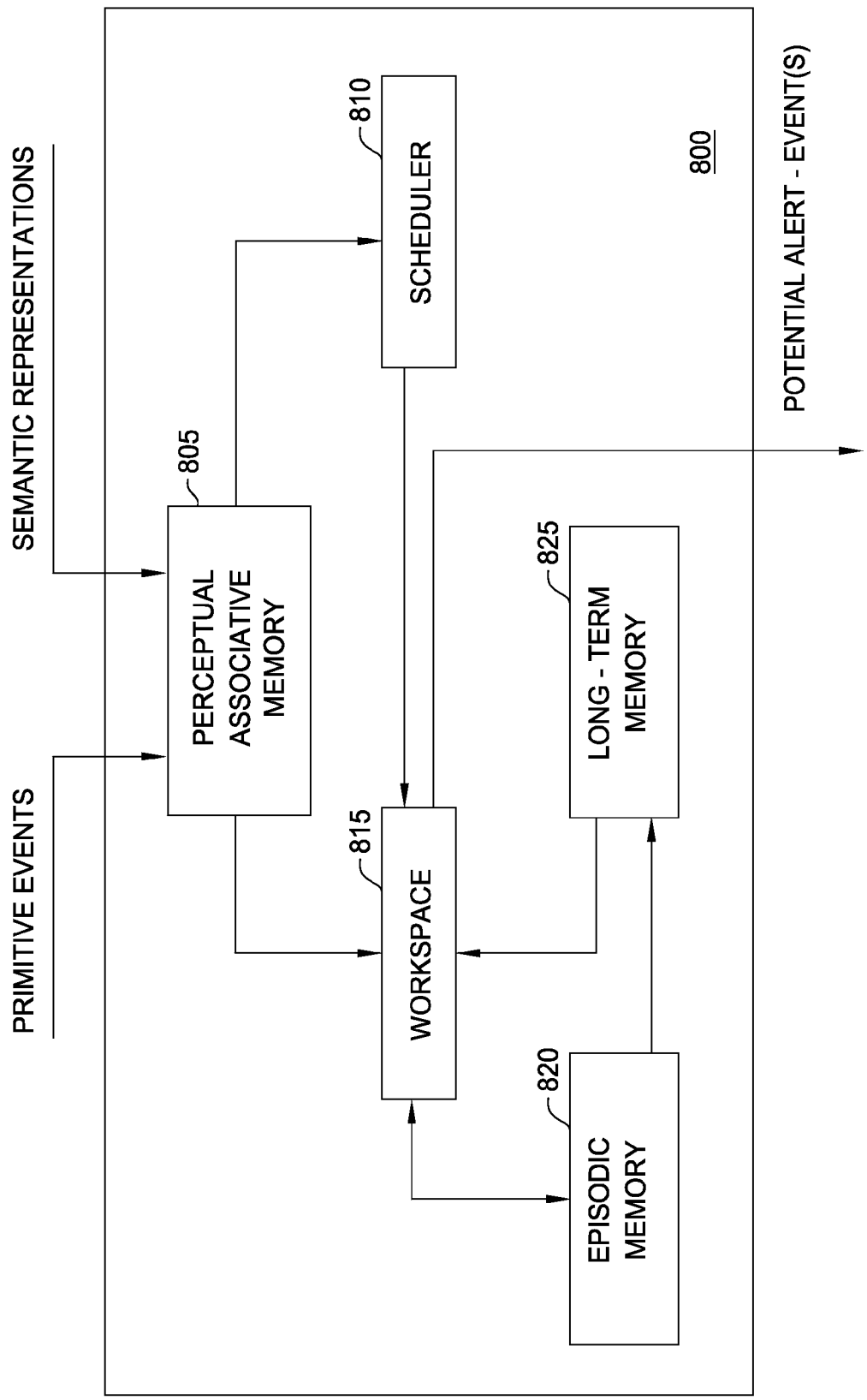
FIG. 8 illustrates a perception module of a machine learning engine, according to one embodiment of the present invention.

FIGS. 7 and 8 illustrate different components of the machine learning engine 140 illustrated in FIG. 1. Specifically, FIG. 7 illustrates components of a semantic analysis module 700 and FIG. 8 illustrates components of a perception module 800, according to one embodiment of the present invention. Generally, the semantic module 700 creates semantic representations (i.e., symbolic representations) of motions and actions of the tracked objects. The semantic representation provides a formal way to describe what is believed to be happening in the scene based on motions of a particular tracked object (and ultimately, based on changes in pixel-color values from frame-to-frame). A formal language grammar (e.g., nouns and verbs) is used to describe events in the scene (e.g., "car parks," "person appears," and the like).

Subsequently, the semantic representations are analyzed for recognizable patterns and the results are provided to a perception module 800 illustrated in FIG. 8. In one embodiment, the semantic module 700 also builds a symbolic map of the scene, including different aspects of the events taking place in the scene, such as symbolic representations of trajectories of the objects in the scene. In one embodiment, the symbolic map may also include a frequency distribution (e.g., data regarding how often and where certain classes or kinds of objects are present in the scene).

As shown in FIG. 7, the semantic module 700 includes a sensory memory 710, a latent semantic analysis module (LSA) 715, a primitive event module 725, a phase space partitioning module 730, an incremental latent semantic analysis module (iLSA) 735, and a formal language module 740. The sensory memory 710 acquires information provided for the semantic module 700 and stores this information for subsequent use by the primitive event module 725 and the phase space partitioning module 730. In one embodiment, the sensory memory 710 identifies which information should be provided for further analysis to the primitive event module 725 and the phase space partitioning module 730.

The primitive event detection module 725 may be configured to identify the occurrence of primitive events (e.g., car stops, reverses direction, disappears, appears; person bends, falls; exchange, and the like) in the sensory memory 710. The primitive events typically reflect changes in kinematic characteristics of the tracked objects. Thus, once an object is classified as being a "car," the primitive event detection module 725 may evaluate data regarding the car to identify different behavioral events as they occur. In one embodiment, the primitive events are pre-defined (e.g., for a specific environment where the self-learning behavior recognition system is used). In another embodiment, only some of the primitive events are pre-defined (e.g., park, turn, fall down), while other primitive events are learned over time (e.g., objects of certain class may be found in a specific spot of the scene).

The phase space partitioning module 730 determines information regarding geometric position having velocity of the objects in the scene. Accordingly, the primitive event module 725 and phase space partitioning module 730 allows the semantic module 700 to analyze data in two distinct ways. Based on the results of the primitive event module 725 and phase space partitioning module 730, the LSA 715 and the iLSA 735 build/update a model of the scene, where the model includes the objects of interest.

LSA 715 is generally an initial training module of the semantic module 700. LSA gathers data over a period of time until LSA 715 generates results of sufficient statistical weight. In other words, LSA 715 learns basic layout of the scene, while iLSA 735 incrementally updates such a layout. It should be noted that iLSA 735 is sufficiently flexible to handle changes in patterns of behavior taking place in the scene. The formal language learning module 740 uses the data generated by the iLSA 735 to create the semantic representations (the symbolic representation of what is happening in the scene) and provides the semantic representations to the perception module 800 for learning what the created semantic representations mean.

FIG. 8 illustrates a perception module of a machine learning engine, according to one embodiment of the invention. The perception module 800 may be configured to process the results generated by at least some of the components of the computer vision 135 and the machine learning engine 140 (e.g., the estimator/identifier module 500, the context processor 600, the semantic module 700, etc.). Generally, the perception module 800 learns patterns, generalizes based on observations, and learns by making analogies.

As shown in FIG. 8, the perception module 800 may include a perceptual associative memory 805, a scheduler 810, a workspace 815, an episodic memory 820, and a long-term memory 825. The workspace 815 provides a memory region that reflects what information is currently being evaluated by machine learning engine 140. That is, the workspace 815 stores what elements of data currently have the "attention" of the machine learning environment 140. As described below, the data in the workspace 815 may include a collection of precepts (each describing an event) and codelets. The perceptual associative memory 805 collects data provided to the perception module 800 and stores such data as percepts. Each percept may provide data describing something that occurred in the video, such as a primitive event. The perceptual associative memory 805 provides percepts and/or codelets to the workspace 815.

A codelet provides a piece of executable code, which describes and/or looks for relations between different percepts. In other words, a codelet summarizes rules for determining a specific behavior/event (e.g., parking event), where the behavior/event involves one or more percepts. Each codelet may be configured to take a set of input precepts and process them in a particular way. For example, a codelet may take a set of input percepts and evaluate them to determine whether a particular event has occurred (e.g., a car parking). Using the example of a car parking, the precept may update episodic memory 820 with information about which car, the color of the car, where the car parked, etc. Further, information about this detected primitive event may be used to update the definition of the primitive event in the long-term memory 825. Further still, codelets recognizing anomalies are employed by the perception module 800. Such codelets access percepts and if a certain percept does not statistically correlate with previously accumulated statistical data, an abnormal event may be identified.

In one embodiment, the codelets are fully pre-written. In another embodiment, at least some codelets are not fully pre-written, but instead, generated over time. For example, a codelet describing normal behavior for certain percept(s) may be self-generated/modifying based on accumulated data describing corresponding observed events.

The scheduler 810 determines which codelet needs to be activated at any given time. For example, the scheduler 810 may seek to identify a match between percepts placed in the workspace 815 and the codelets. When an appropriate set of inputs required for a given codelet (e.g., a set of precepts) is available that codelet may be placed in the workspace 815 and invoked. When multiple codelets are available for activation, the determination of when and which codelet to activate may be random. However, in one embodiment, certain codelets configured have priority over others (e.g., a codelet defining a certain abnormal behavior). At each given moment numerous codelets may be activated by the scheduler 810 within the workspace 815.

The perception module 800 also uses the episodic memory 820 and long-term memory 825 to capture both short-term and long-term data regarding primitive events. The episodic memory 820 is a short term memory for storing recent percepts. For example, a percept that has been recently changed is found in the episodic memory 820. Percepts are placed into the episodic memory 820 from the workspace 815. At the same time, the workspace 815 may use the percepts stored in the episodic memory 820 to match them with the respective codelets.

Typically, at least some percepts migrate from the episodic memory 820 to the long-term memory 825. However, not every piece of data placed into the episodic memory 820 migrates to the long-term memory 825. Some data decays from the episodic memory 820 without ever reaching the long-term memory 825 (e.g., data describing a one-time event that has not been determined as abnormal).

At the same time, aspects of that event may be used to reinforce information in long-term memory 825 (e.g., aspects of how, where, and how long a car parked in a parking space). Thus, long-term memory 825 may be used to build and accumulate general patterns of behavior within a given scene. In one embodiment, the patterns of behavior stored in the episodic memory 820 and the patterns of behavior that have acquired sufficient statistical weight are moved to the long-term memory 825 as the general patterns of behavior. However, not all data placed into the long-term memory 825 stays there. Some data eventually decay (e.g., specific details). For example, if several cars of different colors have been parked in the same place over a period of time, a general pattern of a car being able to park in that specific place may be learned and placed into the long-term memory 825. However details regarding previously parked cars, such as their colors, would decay from the long-term memory 825 after some period of time.

In one embodiment, the workspace 815 uses the general patterns of behavior found in the long-term memory 825 to determine events taking place in the scene. Once an event has been recognized, the information indicating that the recognized event has been identified is generated. Such information is subsequently used to generate alerts. While in one embodiment, only alerts regarding identified abnormal behavior are issued (e.g., assault), in another embodiment, alerts describing identified normal are issued as well (e.g., car parked).

Figure 9A:
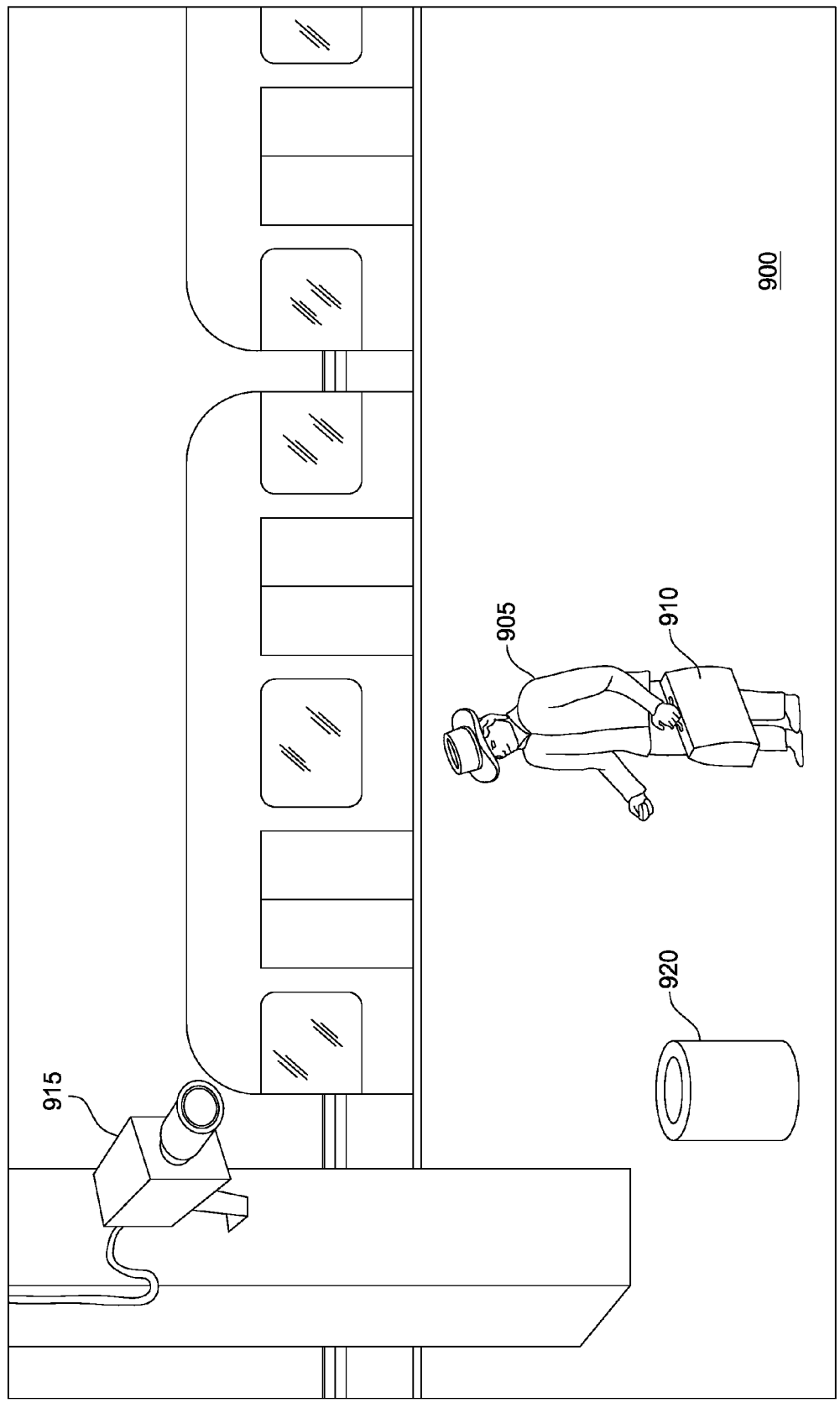
FIGS. 9A-9C illustrate a sequence of a video frames where a behavior recognition system detects an abnormal behavior and issues an alert, according to one embodiment of the present invention.
Figure 9B:
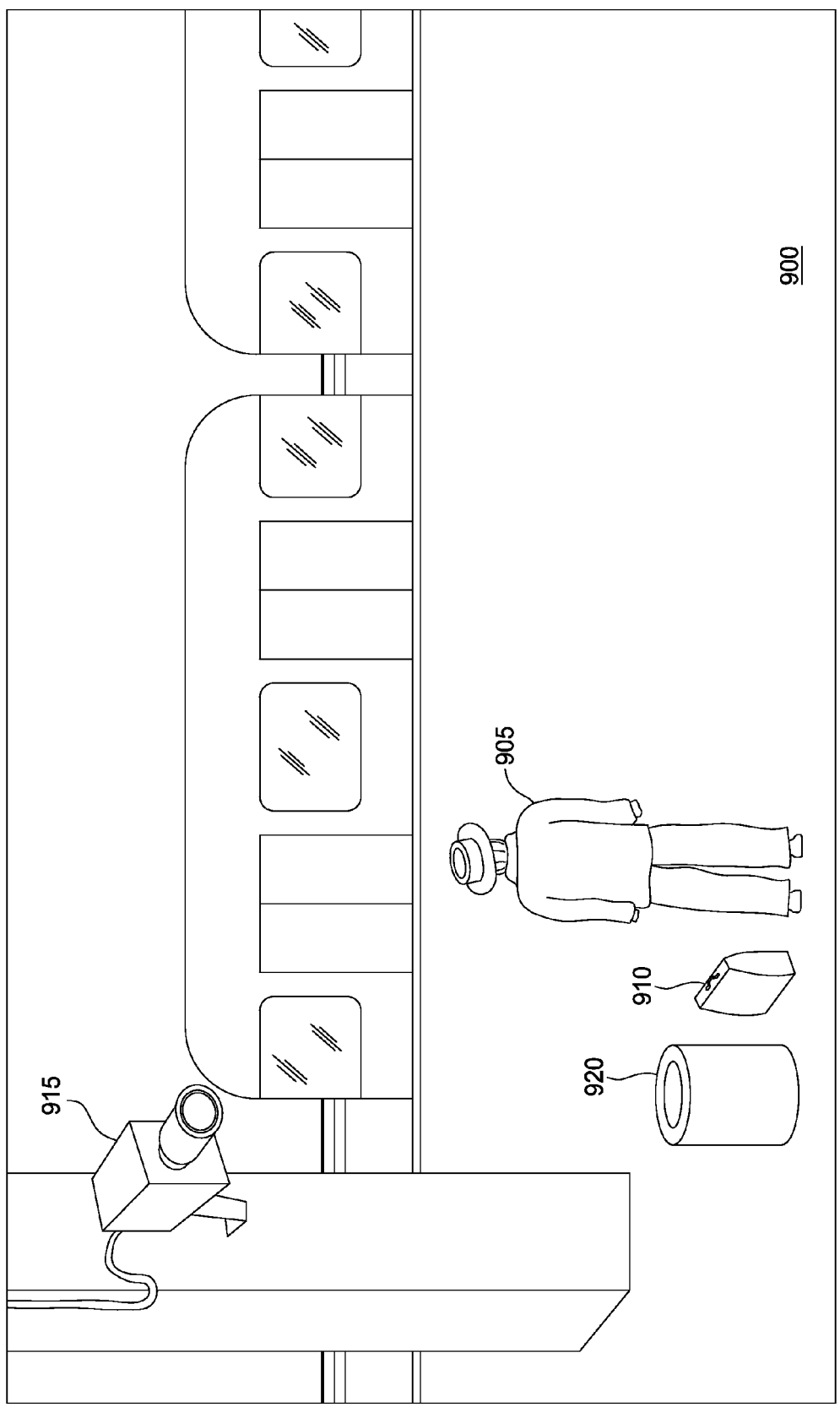
Figure 9C:
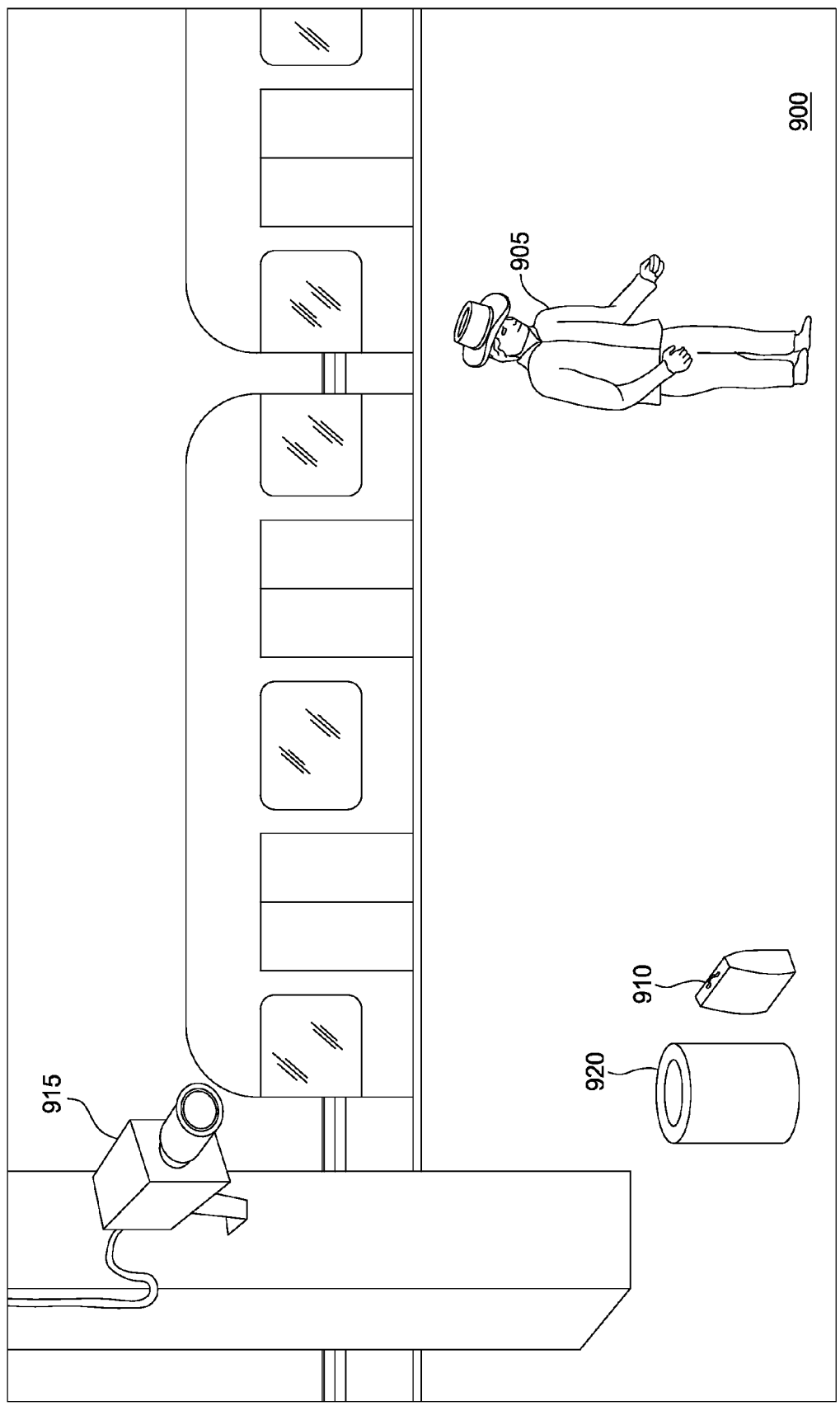

FIGS. 9A-9C illustrate a scenario taking place at a subway station 900 where a behavior recognition system detects an abnormal behavior and issues an alert, according to one embodiment of the present invention. As shown, a stationary video camera 915 captures events taking place at the subway station 900 and provides video images depicting the events to the behavior recognition system. As illustrated in FIGS. 9A-9C, the video camera 915 captures video images of a man 905 carrying a bag 910 while approaching the trash can 920 (FIG. 9A), putting the bag 910 down on the ground next to the trash can 920 (FIG. 9B), and leaving the bag 910 behind (FIG. 9C). Based on the learning from observing humans enter the subway station 900, the act of leaving an "other" object (i.e., the bag) brought by an object classified as a human may be identified as abnormal, and accordingly, the behavior recognition system may issue an alert to indicate the occurrence of such an event.

According to the above discussed principles, the behavior recognition system treats the pixels displaying stationary trash can 920 as a part of a background image, without specifically identifying the trash can 920 as a trash can. In contrast, the behavior recognition system treats both the man 905 and the bag 910 as foreground image(s). Initially (FIG. 9A), the self-learning behavior recognition system may consider the man 905 and the bag 910 as one foreground blob. However, as the man 905 puts the bag 910 down (FIGS. 9B-9C), the man and the bag 910 become parts of separate foreground blobs. While in one embodiment, as the man 905 picks up the bag 910 their respective foreground blobs would merge into a new foreground blobs, in another embodiment, the man 905 and the bag 910 are continued to be treated as two distinct foreground blobs. In yet another embodiment, the man 905 and the bag 910 are considered to be separate foreground blobs from the beginning (FIG. 9A).

For both the man 905 and the bag 910 the behavior recognition system builds and updates search models to track these objects frame-by-frame. Further, behavior-recognition system classifies the man 905 as a "human" and the bag 910 as "other" (alternatively as a "bag"), collects information about them, and predicts their actions based on previously learned behavior of people and bags in the subway station. As leaving a bag behind is not associated with a normal learned behavior, the behavior-recognition system identifies such behavior as abnormal and issues an alert. Alternatively, such behavior may be identified as abnormal because the system has previously learned that the leaving a bag behind situation indicates abnormal behavior.

While the foregoing is directed to embodiments of the present invention, other and further embodiments of the invention may be devised without departing from the basic scope thereof, and the scope thereof is determined by the claims that follow.

What is claimed is:

1. A method for processing a stream of video frames recording events within a scene, the method comprising:
   receiving a first frame of the stream, wherein the first frame includes data for a plurality of pixels included in the frame;
   identifying one or more groups of pixels in the first frame, wherein each group depicts an object within the scene;
   generating a search model storing one or more features associated with each identified object;
   classifying each of the objects using a trained classifier;
   tracking, in a second frame, each of the objects identified in the first frame using the search model;
   supplying the first frame, the second frame, and the object classifications to a machine learning engine; and
   generating, by the machine learning engine, one or more semantic representations of behavior engaged in by the objects in the scene over a plurality of frames, wherein the machine learning engine is configured to learn patterns of behavior observed in the scene over the plurality of frames and to identify occurrences of the patterns of behavior engaged in by the classified objects.

2. The method of claim 1, further comprising issuing at least one alert indicating an occurrence of one of the identified patterns of behavior by one of the tracked objects.

3. The method of claim 1, wherein each search model is generated as one of an appearance model and a feature-based model.

4. The method of claim 1, wherein the step of tracking, in the second frame, each of the objects identified in the first frame using the search model comprises:
   locating the identified objects within the second frame; and
   updating the respective search model for each identified object.

5. The method of claim 1, wherein the trained classifier is configured to classify each object as one of a human, car, or other.

6. The method of claim 5, wherein the trained classifier is further configured to estimate at least one of a pose, a location, and a motion for at least one of the classified objects, based on changes to the group of pixels depicting the object over a plurality of successive frames.

7. The method of claim 1, wherein the step of identifying one or more groups of pixels in the first frame comprises:
   identifying at least one group of pixels representing a foreground region of the first frame and at least one group of pixels representing a background region of the first frame;
   segmenting foreground regions into foreground blobs, wherein each foreground blob represents an object depicted in the first frame; and
   updating a background image of the scene based on the background regions identified in the first frame.

8. The method of claim 7, further comprising updating an annotated map of the scene depicted by the video stream using the results of the steps of generating a search model storing one or more features associated with each identified object; classifying each of the objects using a trained classifier; and tracking, in a second frame, each of the objects identified in the first frame using the search model.

9. The method of claim 8, wherein the annotated map describes a three dimensional geometry of the scene including an estimated three-dimensional position of the identified objects and an estimated three-dimensional position of a plurality of objects depicted in the background image of the scene.

10. The method of claim 8, wherein the step of building semantic representations further comprises analyzing the built semantic representations for recognizable behavior patterns using latent semantic analysis.

11. A non-transitory computer-readable storage medium containing a program, which, when executed on a processor is configured to perform an operation, comprising:
   receiving a first frame of the stream, wherein the first frame includes data for a plurality of pixels included in the frame;
   identifying one or more groups of pixels in the first frame, wherein each group depicts an object within the scene;
   generating a search model storing one or more features associated with each identified object;
   classifying each of the objects using a trained classifier;
   tracking, in a second frame, each of the objects identified in the first frame using the search model;
   supplying the first frame, the second frame, and the object classifications to a machine learning engine; and
   generating, by the machine learning engine, one or more semantic representations of behavior engaged in by the objects in the scene over a plurality of frames, wherein the machine learning engine is configured to learn patterns of behavior observed in the scene over the plurality of frames and to identify occurrences of the patterns of behavior engaged in by the classified objects.

12. The non-transitory computer-readable storage medium of claim 11, wherein the operation further comprises issuing at least one alert indicating an occurrence of one of the identified patterns of behavior by one of the tracked objects.

13. The non-transitory computer-readable storage medium of claim 11, wherein each search model is generated as one of an appearance model and a feature-based model.

14. The non-transitory computer-readable storage medium of claim 11, wherein the step of tracking, in the second frame, each of the objects identified in the first frame using the search model comprises:
   locating the identified objects within the second frame; and
   updating the respective search model for each identified object.

15. The non-transitory computer-readable storage medium of claim 11, wherein the trained classifier is configured to classify each object as one of a human, car, or other.

16. The non-transitory computer-readable storage medium of claim 15, wherein the trained classifier is further configured to estimate at least one of a pose, a location, and a motion for at least one of the classified objects, based on changes to the group of pixels depicting the object over a plurality of successive frames.

17. The non-transitory computer-readable storage medium of claim 11, wherein the step of identifying one or more groups of pixels in the first frame comprises:
identifying at least one group of pixels representing a foreground region of the first frame and at least one group of pixels representing a background region of the first frame;
segmenting foreground regions into foreground blobs, wherein each foreground blob represents an object depicted in the first frame; and
updating a background image of the scene based on the background regions identified in the first frame.

18. The non-transitory computer-readable storage medium of claim 17, wherein the operation further comprises updating an annotated map of the scene depicted by the video stream using the results of the steps of generating a search model storing one or more features associated with each identified object; classifying each of the objects using a trained classifier; and tracking, in a second frame, each of the objects identified in the first frame using the search model.

19. The non-transitory computer-readable storage medium of claim 18, wherein the annotated map describes a three dimensional geometry of the scene including an estimated three-dimensional position of the identified objects and an estimated three-dimensional position of a plurality of objects depicted in the background image of the scene.

20. The non-transitory computer-readable storage medium of claim 18, wherein the step of building semantic representations further comprises analyzing the built semantic representations for recognizable behavior patterns using latent semantic analysis.

21. A system, comprising:
a video input source;
a processor; and
a memory storing:
a computer vision engine, wherein the computer vision engine is configured to:
receive, from the video input source, a first frame of the stream, wherein the first frame includes data for a plurality of pixels included in the frame,
identify one or more groups of pixels in the first frame, wherein each group depicts an object within the scene,
generate a search model storing one or more features associated with each identified object,
classify each of the objects using a trained classifier,
track, in a second frame, each of the objects identified in the first frame using the search model, and
supply the first frame, the second frame, and the object classifications to a machine learning engine; and
the machine learning engine, wherein the machine learning engine is configured to generate one or more semantic representations of behavior engaged in by the objects in the scene over a plurality of frames and further configured to learn patterns of behavior observed in the scene over the plurality of frames and to identify occurrences of the patterns of behavior engaged in by the classified objects.

22. The system of claim 21, wherein the machine learning engine is further configured to issue at least one alert indicating an occurrence of one of the identified patterns of behavior by one of the tracked objects.

23. The system of claim 21, wherein each search model is generated as one of an appearance model and a feature-based model.

24. The system of claim 21, wherein the step of tracking, in the second frame, each of the objects identified in the first frame using the search model comprises:
locating the identified objects within the second frame; and
updating the respective search model for each identified object.

25. The system of claim 21, wherein the trained classifier is configured to classify each object as one of a human, car, or other.

26. The system of claim 25, wherein the trained classifier is further configured to estimate at least one of a pose, a location, and a motion for at least one of the classified objects, based on changes to the group of pixels depicting the object over a plurality of successive frames.

27. The system of claim 21, wherein the computer vision engine is configured to identify the one or more groups of pixels in the first frame by performing the steps of:
identifying at least one group of pixels representing a foreground region of the first frame and at least one group of pixels representing a background region of the first frame;
segmenting foreground regions into foreground blobs, wherein each foreground blob represents an object depicted in the first frame; and
updating a background image of the scene based on the background regions identified in the first frame.

28. The system of claim 27, wherein the computer vision engine is further configured to update an annotated map of the scene depicted by the video stream using the generated search model storing one or more features associated with each identified object.

29. The system of claim 28, wherein the annotated map describes a three dimensional geometry of the scene including an estimated three-dimensional position of the identified objects and an estimated three-dimensional position of a plurality of objects depicted in the background image of the scene.

30. The system of claim 28, wherein the step of building semantic representations further comprises analyzing the built semantic representations for recognizable behavior patterns using latent semantic analysis.

* * * * *